No. 727,024. Patented May 5, 1903.

UNITED STATES PATENT OFFICE.

JULIUS TAFEL, OF WÜRZBURG, GERMANY, ASSIGNOR TO C. F. BOEHRINGER & SOEHNE, OF MANNHEIM-WALDHOF, GERMANY, A FIRM.

MANUFACTURE OF CAMPHIDON.

SPECIFICATION forming part of Letters Patent No. 727,024, dated May 5, 1903.

Application filed April 3, 1901. Serial No. 54,155. (No specimens.)

*To all whom it may concern:*

Be it known that I, JULIUS TAFEL, a citizen of Bavaria, residing at Hangerring 13½, Würzburg, Bavaria, Germany, have invented certain new and useful Improvements in the Manufacture of Camphidon; and I do hereby declare the following to be a full, clear, and exact description of the invention, such as will enable others skilled in the art to which it appertains to make and use the same.

The present invention relates to the manufacture of derivatives of camphoric acid, and more particularly to the preparation of products richer in hydrogen than imido-camphoric acid.

I have found that by subjecting imido-camphoric acid, which has the formula $C_{10}H_{15}NO_2$, to electrolytic reduction a new body poorer in oxygen and richer in hydrogen and having the composition $C_{10}H_{17}NO$ may be obtained, which new compound I term "camphidon." The reaction proceeds in a manner similar to that involved in the production of pyrrolidon from succinimide. If the reduction in the latter case is continued somewhat further some pyrrolidin is concurrently obtained, as is known. In a similar manner a higher hydrated body, which I term "camphidin," is formed, together with the camphidon. These new compounds, camphidon and camphidin, which are to serve as pharmacal compounds, are prepared in the following manner, which I consider the preferred way of carrying out my invention:

One kilogram of imido-camphoric acid is dissolved, together with 0.650 kilogram of sulfuric acid, in about nine liters of water, which solution is then poured into the cathode-compartment of an electrolytic cell or bath. The anode-compartment having been similarly charged with dilute sulfuric acid, the current is passed through the cell for three and one-half hours, said current having a concentration or strength of one hundred and twenty amperes per liter and the cathode-surface being ten square decimeters per liter of electrolytic bath. The cathode employed is a lead cathode prepared according to the method given by myself in *Berichte d. Deutschen Chemische Gesellschaft*, Vol. 33, page 2209. After the reduction has been completed the major portion of the sulfuric acid is removed by precipitation with calcium carbonate, filtering and extracting the resultant camphidon from the filtrate by repeated shaking with chloform. Upon thereafter evaporating the chloroform the new compound camphidon is left as a soft crystalline mass having a weak or faint camphor-like odor. I find its melting-point to be 220° centigrade. At a higher temperature it sublimes, and it boils at about 308° centigrade.

The new compound has a cooling and very bitter taste. It is readily soluble in all of the usual solvents with the exception of cold water. When heated with a small quantity of water, it melts and is dissolved copiously, but crystallizes out of the solvent on cooling.

The picrate of this new compound is characteristic of the same. By adding a picrin solution to cold aqueous solution of camphidin the picrate is obtained in the form of yellow acicular crystals.

From the acid filtrate, from which the camphidon has been removed in the manner indicated above, the other new compound, the camphidin, is obtained by first supersaturating with alkali, such as soda-lye, and then driving off the camphidin with steam. It is thus obtained as a light soft crystalline mass having an intense camphor-like odor. Its composition is indicated by the formula $C_{10}H_{19}N$. At 186° centigrade it melts to form a colorless liquid which distils without decomposition at 209° centigrade. It is soluble with considerable difficulty in cold and hot water. It is distinguished from camphidon by its volatility under the influence of steam or aqueous vapor and by its strong basicity.

The new compound, camphidin, hereinabove described and the process of manufacturing the same are not herein claimed, being covered in my application filed August 13, 1902, Serial No. 119,529.

What I claim, and desire to secure by Letters Patent of the United States, is—

1. The process which consists in submitting an acid-bath of imido-camphoric acid to electrolytic reduction.

2. The process which consists in submitting a solution of imido-camphoric acid in sulfuric acid in the cathode-compartment of an electrolytic cell to the action of the electric current.

3. The process which consists in submitting a solution of imido-camphoric acid in sulfuric acid in the cathode-compartment of an electrolytic cell to the action of the electric current and then removing the greater portion of the sulfuric acid and treating the remainder with chloroform to separate the resultant camphidon.

4. The process which consists in submitting a solution of imido-camphoric acid in sulfuric acid in the cathode-compartment of an electrolytic cell to the action of the electric current and then adding calcium carbonate to precipitate the greater portion of the sulfuric acid, filtering and extracting the filtrate with chloroform.

5. As a new chemical compound camphidon having the formula $C_{10}H_{17}NO$, whose melting-point is 220°, centigrade, and which sublimes at higher temperature, boiling at about 308°, centigrade, which has a cooling bitter taste, is readily soluble in the usual solvents excepting cold water and the picrate of which may be obtained in yellow acicular crystals.

In testimony whereof I affix my signature in presence of two witnesses.

JULIUS TAFEL.

Witnesses:
F. TAFEL,
WILHELM WISLICENUS.